No. 875,334.
PATENTED DEC. 31, 1907.
J. W. ECKLEY.
CUTTING TOOL.
APPLICATION FILED APR. 5, 1907.
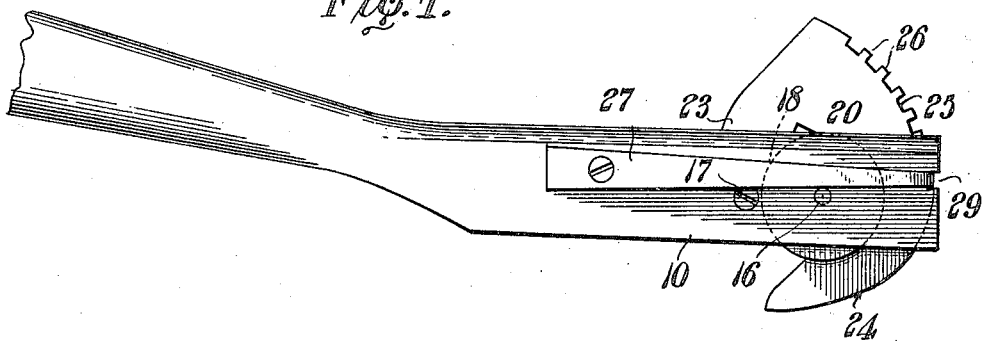
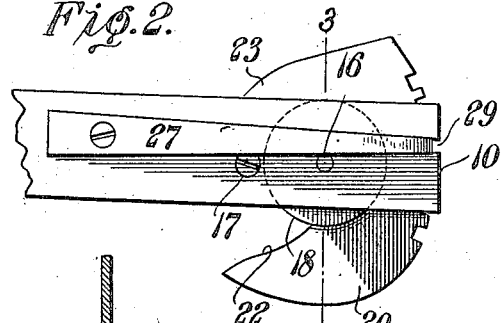
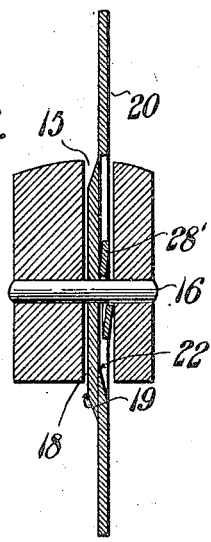
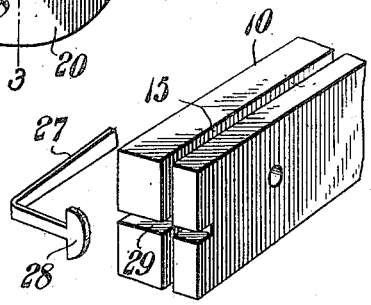
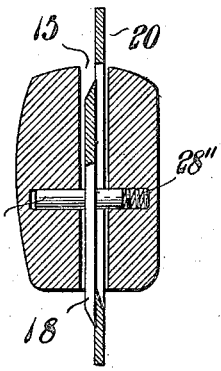
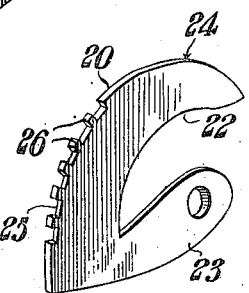
WITNESSES:
James W. Eckley,
INVENTOR
By C. A. Snow & Co.
ATTORNEYS

UNITED STATES PATENT OFFICE.

JAMES W. ECKLEY, OF WALLACETON, PENNSYLVANIA, ASSIGNOR OF ONE-HALF TO GEORGE F. GOSS, OF WALLACETON, PENNSYLVANIA.

CUTTING-TOOL.

No. 875,334.      Specification of Letters Patent.      31, 1907.

Application filed April 5, 1907. Serial No. 366,604.

*To all whom it may concern:*

Be it known that I, JAMES W. ECKLEY, a citizen of the United States, residing at Wallaceton, in the county of Clearfield and State of Pennsylvania, have invented a new and useful Cutting-Tool, of which the following is a specification.

This invention relates to cutting knives, and has for its principal object to provide a knife of simple and compact construction to be used more especially for the cutting of oil cloth, linoleum, leather and similar materials.

A further object of the invention is to provide a cutting device which includes a pair of cutting members, one of which is adjustable in the direction of the length of its cutting edge in order to present successively sharp surfaces to the cutting point.

A still further object of the invention is to provide a cutting device including a disk cutter and a stationary cutter, the cutting edges of which are arranged on intersecting curved lines forming a gradually contracted space into which the material will be guided and severed.

A still further object of the invention is to provide a tool of this class in which the material being cut will serve as a means for maintaining the cutters in close contact with each other, so that the device will be to some extent self sharpening.

A still further object of the invention is to provide a tool of this type which may be used in cutting oil cloth, linoleum or the like on the floor while the operator stands in an erect position.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of the lower portion of a cutting tool constructed in accordance with the invention. Fig. 2 is a similar view of the head of the tool showing one of the cutter blades adjusted to a different position. Fig. 3 is a transverse sectional view on the line 3—3 of Fig. 2. Fig. 4 is a perspective view of the relatively stationary cutter. Fig. 5 is a detail perspective view of the lower end of the handle showing, also, the retaining device of the adjustable cutter. Fig. 6 is a view similar to Fig. 3 illustrating a slight modification.

Similar numerals of reference are employed to indicate corresponding parts throughout the several figures of the drawings.

The working parts of the device are mounted in a suitable handle having a head 10, the head proper being of any length and in some cases curving upward so that the operator may stand in an erect position while cutting oil cloth or the like on the floor.

In the head 10 is a longitudinally disposed slot 15 and through the head extends an arbor 16 and a pivot pin 17. On the arbor is mounted a revoluble cutting disk 18, the outer face of which is beveled toward a cutting edge, as indicated at 19, and in practice this beveled edge will by engagement against the edge of the cut serve to force two cutters into close contact with each other.

The relatively stationary cutter 20 has a cutting edge 22 of considerable length, the cutting edge 22 being on an arc struck from the center of the pin 17, so that this edge and the edge of the disk intersect on curved lines and form a gradually narrowing space into which the material being cut is guided, the actual point of severing being, of course, at the intersecting point of the two cutting edges. The cutting blade 20 is provided with an arm 23 that is mounted on the pin 17 and at a point below the cutting edge the blade is curved, as indicated at 24, forming a shoe that is arranged to travel along the floor or which in practice may be arranged to travel in a suitable guiding groove where a grooved board or the like is employed for the purpose of insuring straight cuts of the material. The outer edge 25 of the blade is arranged on a curved line struck from the center of the pivot pin 17, and this edge is provided with a plurality of notches 26, said notches being arranged for the reception of a spring locking arm 27 that is provided with a head 28 which may be manually engaged for the purpose of withdrawing said arm from any one of the notches. The opposite end of the locking arm 27 is riveted or otherwise secured to the head, and if left free said arm will spring into one of the notches 26 and into alining notches 29 that are formed at the end of the head 10, and thus firmly lock the blade 20 from movement.

In practice the tool is drawn against the material to be cut, so that such material is guided into the gradually narrowing space between the disk cutter 22 and the relatively stationary cutter 18. The tool may be drawn across the material, either in a straight line or to follow any line previously marked, and a sharp clean cut will be effected in much less time than is possible with the cutting tools now employed for the purpose.

One of the principal advantages of the invention resides in the fact that there is a very small portion of the length of the cutting edge 22 in operation at one time, and after said blade has been sharpened it is turned so that the arm 27 is locked into the first of the notches, and the cutting point is then close to the lowermost end of said cutting edge 22. After a time this cutting edge become dulled, but instead of removing and resharpening, the blade it is merely necessary to pull out the spring arm and turn the blade to the extent of another notch, or to one or two notches, as shown, for instance, in Fig. 2, the blade being adjustable notch by notch as the knife becomes too dull for use. After the cutting edge has been dulled, the blade may be removed and resharpened.

In making the cutting edges, the outer face of the disk is beveled, as indicated at 19, and the outer face of the blade 20 is beveled and these two beveled faces traveling in the cut which they form in the material are forced together, so that the two cutting members will bind upon each other to such an extent that the device will be more or less self sharpening, while the members are held in proper relation for effective cutting.

In order to avoid binding to an extent which would prevent the proper manipulation of the device, a spring washer 28' is preferably introduced around the pin 16 in a position between one face of the groove 15 and the inner face of the disk 18. The force exerted in this washer is not sufficient to move the cutting edges apart, but merely serves to some extent to counter-act the lateral thrust due to the action of the material on the beveled edge 19.

With a device constructed in accordance with this invention, oil cloth, linoleum, leather and the like may be rapidly and effectually cut and previously marked lines may be readily followed, even where the operator is standing in an erect position.

In the construction shown in Fig. 6, the cutting disk is rigidly secured to the arbor by shrinking or otherwise, and the spring 28'' is placed in a recess in which one end of the arbor finds its bearing.

I claim:—

1. In a device of the class specified, a revoluble cutter disk, a pivotally mounted cutting member, the edge of which intersects that of the disk, said pivotally mounted member being adjustable to present successively fresh portions of the cutting edge to operative position, and means for locking said pivotally mounted cutting member in adjusted position.

2. In a device of the class specified, a revoluble cutting disk, a pivotally mounted cutter having a notched periphery, said cutter being adjustable to present successively fresh portions of the edge to operative position, and a locking member arranged to enter said notches.

3. In a device of the class specified, a carrying head, a revoluble cutter, a pivotally mounted cutter, both of said cutters having beveled outer faces for engagement with the sides of the cut which they form, the pivoted cutter having a notched outer edge, and a spring locking arm arranged to enter the notches.

4. In a device of the class specified, a carrying handle having a terminal head, an arbor, and a pivot pin extending therethrough, a disk cutter on the arbor, a cutting blade mounted on the pivot pin and having a cutting edge on an arcuate line struck from such pivot, the outer edge of the cutting blade being notched, a spring locking arm arranged to enter the notches, the end of the head being provided with alining notches into which said arm may enter when in locking position, and a spring washer tending to force the revoluble cutter away from said cutting member.

5. In a cutting tool, a pair of cutters having beveled outer edges for engagement with the sides of the cut which they form, and a spring tending to force the cutters apart to prevent excess friction between them during the cutting operation.

In testimony that I claim the foregoing as my own, I have hereto affixed my signature in the presence of two witnesses.

JAMES W. ECKLEY.

Witnesses:
STEWART WILSON,
ED. DIXON.